United States Patent
Messick

[15] 3,699,417
[45] Oct. 17, 1972

[54] FIRING ANGLE ADVANCE LIMIT FOR THYRISTOR BRIDGE POWER AMPLIFIER

[72] Inventor: Mikel Jay Messick, Chagrin Falls, Ohio
[73] Assignee: Square D Company, Park Ridge, Ill.
[22] Filed: Oct. 22, 1970
[21] Appl. No.: 83,074

[52] U.S. Cl.................................318/257, 318/293
[51] Int. Cl................................................H02p 5/16
[58] Field of Search..............318/257, 258, 293, 300

[56] References Cited

UNITED STATES PATENTS

| | | |
|---|---|---|
| 3,579,080 | 5/1971 | Vollrath.................318/257 X |
| 3,541,426 | 11/1970 | Joslyn et al................318/257 |
| 3,551,782 | 12/1970 | Maynard..................318/257 |
| 3,431,479 | 3/1969 | Joslyn......................318/257 |

*Primary Examiner*—Bernard A. Gilheany
*Assistant Examiner*—W. E. Duncanson, Jr.
*Attorney*—Harold J. Rathbun and Richard T. Guttman

[57] ABSTRACT

A control system for operating a direct current motor from an alternating current power source includes a power amplifier responsive to a control voltage for applying rectified operating voltage pulses to the motor, means responsive to the magnitude of the control voltage to determine the duration of the operating voltage pulses, and limit means for minimizing the magnitude of the control voltage from 170° in each half cycle of applied operating voltage to 10° in the next half cycle to limit the duration of the pulses.

9 Claims, 10 Drawing Figures

PATENTED OCT 17 1972

*INVENTOR.*
MIKEL JAY MESSICK

BY Harold J. Rathburn
atty.

FIRING ANGLE ADVANCE LIMIT FOR THYRISTOR BRIDGE POWER AMPLIFIER

The present invention relates to bidirectional speed control of D.C. motors. Methods which have previously been used for controlling the speed of D.C. motors include the varying of resistance in the field or armature circuits or both by using either contactors or rheostats. These methods cannot provide quiet, smooth and reliable bidirectional speed control nor are they adaptable for automatic operation in a system requiring infinite speed adjustment. Motor generator sets have been used for infinite speed control but are now impractical due to the extra rotating machinery required.

Electronic, and more recently solid state, speed controls have been able to provide the needed adjustability and responsiveness to regulating signals. One type of solid state control is the thyristor bridge circuit using four silicon controlled rectifiers or thyristors in a full wave bridge. The thyristors supply voltage pulses to the armature while a fixed field is supplied by an independently powered coil or by a permanent magnet. The time of firing of the thyristors during each half-cycle precisely determines the duration of the voltage pulses so that infinitely adjustable speed control of the motor results. However, a single SCR or thyristor bridge, without more, provides only unidirectional control and a second bridge is often used for reversal or for plugging of the motor.

It has been found that a single thyristor bridge in modified form can be made to supply selectively reversed direct current for bidirectional motor control by utilizing a power transformer and an inductive reactor in a "balanced" arrangement. When the thyristors are fired in pairs at 90° on alternate half-cycles, no current flows through the armature resulting in a condition of zero motor speed. As the firing point of one thyristor of each pair is advanced and the firing point of the other thyristor of each pair is retarded, a voltage is placed across the armature which increases in effective magnitude with the advance of the firing angle and has a polarity which depends upon which thyristor of each pair is advanced. In this manner bidirectional speed control may be achieved. However, it has been found that if the advanced one of each pair of thyristors is allowed to fire at 0° while the retarded thyristor of each pair fires at 180°, an attempt to reduce the motor speed causes the circuit to produce strong current pulses which can cause serious damage to the bridge components.

The firing angle advance limit circuit of the present invention limits the power output of the thyristor bridge circuit to between approximately 10° and 170° of each half-cycle, thereby preventing damage to the circuit components.

The duration of firing is determined by the magnitude of the voltage output of an operational amplifier in that an increase in the voltage output of the amplifier correspondingly increases the time that voltage is applied to the motor during each half cycle. The firing angle advance limit circuit shorts the feedback resistor of the amplifier to reduce the output to near zero between about 170° of one half cycle and about 10° of the next half cycle.

Other advantages and objects of the present invention will become apparent from the following description wherein reference is made to the drawings, in which.

Figure 1:
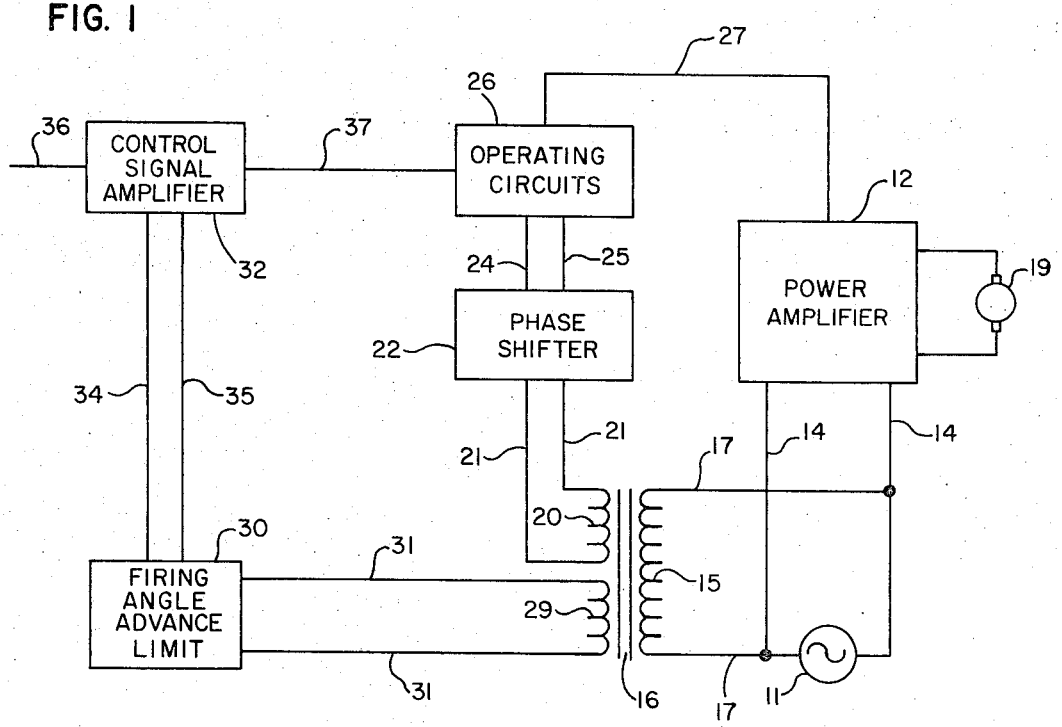
FIG. 1 is a block diagram of a motor control system utilizing the firing angle advance limit circuit of the present invention.

The firing angle advance limit circuit of the present invention is particularly suitable for use as part of a bidirectional speed control system for a direct current motor, such as the system represented in FIG. 1. Referring to FIG. 1, a source 11 of alternating current supplies a motor operating voltage to a power amplifier 12 through a pair of conductors 14 and is connected to the primary winding 15 of a transformer 16 by a pair of conductors 17. The power amplifier 12 supplies direct current to an armature 19 of an armature 19 of a motor having a separately powered field and preferably having a permanent magnet field.

A secondary winding 20 of the transformer 16 is connected by a pair of conductors 21 to a phase shifter 22 the output of which is transmitted by conductors 24 and 25 to operating circuits 26 which in turn transmit firing pulses to the power amplifier 12 via a set of conductors indicated at 27. A secondary winding 29 of the transformer 16 supplies power to a firing angle advance limit circuit 30, made in accordance with this invention, through a pair of conductors 31. The firing angle advance limit circuit 30 acts on a control signal amplifier 32 through conductors 34 and 35 in a manner to be described in detail. A control signal is supplied to the control signal amplifier 32 through a conductor 36 and an output signal is transmitted from the amplifier 32 to the operating circuits 26 through a conductor 37.

Figure 2:
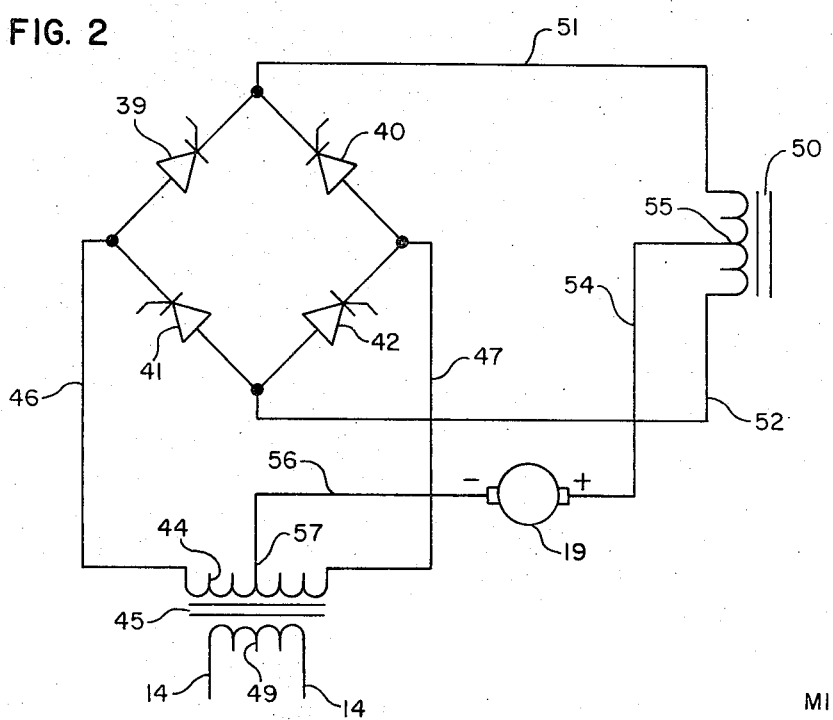
FIG. 2 is a schematic diagram of a preferred power amplifier for use in the system of FIG. 1.

The power amplifier 12, as shown in FIG. 2, comprises four controlled conduction devices having triggering terminals, preferably four SCR's or thyristors 39–42, connected in a full wave bridge across the secondary winding 44 of a transformer 45 by conductors 46 and 47. The primary winding 49 of the transformer 45 is connected to the source of alternating current 11 (FIG. 1) by the conductors 14. The output of the thyristor bridge 39-42 is transmitted through an iron-core reactor 50 through conductors 51 and 52. A conductor 54 connects a center tap 55 of the reactor 50 to one terminal of the armature 19 and a conductor 56 connects a center tap 57 on the secondary winding 44 of the transformer 45 to the other terminal of the armature 19.

The magnitude and direction of the voltage applied to the armature 19 is determined by the phase angles at which the thyristors 39–42 are switched from the blocking state to the conducting state. The thyristors are fired in pairs. For example, to maintain the motor in a condition of zero voltage and speed, the thyristors 39 and 42 are fired at 90° on the positive half cycle of transformer voltage and thyristors 40 and 41 are fired at 90° on the negative half cycle.

Assume first that the thyristors 39 and 42 are turned on simultaneously at 90° during the positive half cycle of line voltage input. By following the circuit from the secondary winding 44 of the transformer 45 through the conductor 46, thyristor 39, conductor 51, reactor 50, conductor 52, thyristor 42 and conductor 47 back to the secondary 44, it is readily seen that the reactor 50 is connected directly across the secondary 44. The potential difference between the center tap 57 of the secondary winding 44 of the transformer 45 and the center tap 55 of the reactor 50 is zero for this condition so that the armature 19 does not rotate. The current continues to flow in this same path to about 90° of the negative half cycle because, after reversal of the polarity of the transformer 45, the collapse of the flux in the reactor 50 causes the polarity of the voltage across the reactor 50 to reverse and it then becomes a power source to supply its stored energy to the line. The other pair of thyristors 40 and 41 operates in the same manner during the negative half cycle of voltage input as the thyristors 39 and 42 operate during the positive half cycle.

In order to apply power to the motor, the firing of one thyristor of each pair must be advanced toward zero degrees while the firing of the other thyristor of each pair is retarded toward 180°. Motor terminal voltage with the armature polarity shown in FIG. 2 is obtained by advancing the firing of thyristors 39 and 40 while retarding the firing of thyristors 41 and 42. For the positive half cycle of voltage input, the armature current path with the thyristor 39 on and the thyristor 42 off is from the secondary 44 through the conductor 46, thyristor 39, one-half of the reactor 50 to the center tap 55, and then through the armature 19 and the conductor 56 to the center tap 57 of the secondary 44. When the thyristor 42 is turned on later in the half cycle, the reactor 50 is again effectively connected across the transformer 45 and the current path is again through the thyristor 39, the full reactor 50, and the thyristor 42. The thyristors 40 and 41 operate in the same manner during the negative half cycle of applied voltage as the thyristors 39 and 42 operate during the positive half cycle. During the negative half cycle, the path of the motor current is from the secondary 44 through the conductor 47, the thyristor 40, one-half the reactor 50 to the center tap 55, and through the armature 19 to the center tap 57 of the secondary 44.

Reversal of the polarity of the voltage impressed on the armature 19, as for plugging or reverse operation of the motor, is obtained by advancing the firing angle of the thyristors 41 and 42 while retarding the firing angle of the thyristors 39 and 40. For the positive half cycle of applied voltage, the current path with the thyristor 42 on and the thyristor 39 off is from the center tap 57 of the secondary 44 through the armature 19, conductor 54, and one-half the reactor 50, conductor 52, thyristor 42, and through conductor 47 to the secondary 44. When the thyristor 39 is turned on later in the half cycle, the reactor 50 is again connected across the transformer 45 and the current path is again through the thyristor 39, the reactor 50 and the thyristor 42. The thyristors 40 and 41 again operate in the same manner during the negative half cycle of applied voltage as the thyristors 39 and 42 operate during the positive half cycle. In this half cycle, the path of the armature current is from the center tap 57 of the secondary 44 through the armature 19, conductor 54, one-half of the reactor 50, conductor 52, the thyristor 41 and conductor 46 to the secondary 44. The firing of the thyristor 40 later in the half cycle again connects the reactor 50 directly across the secondary 44.

Figure 3:
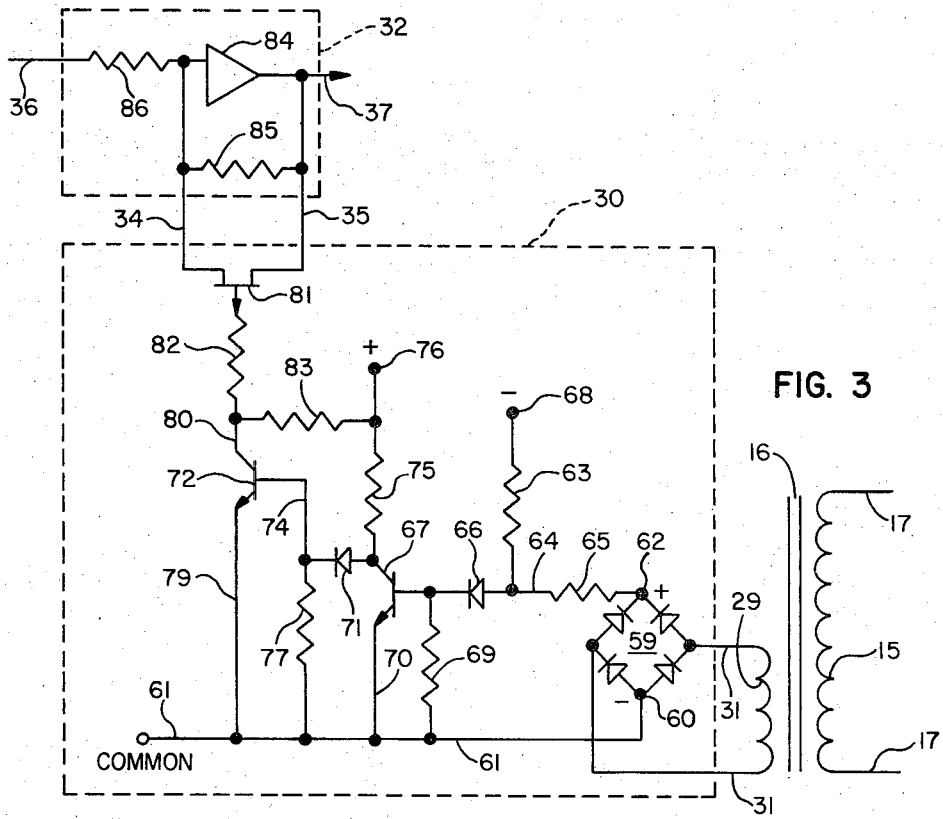
FIG. 3 is a schematic diagram of a control signal amplifier and the preferred firing angle advance limit circuit for use in the system of FIG. 1.

The firing angle advance limit circuit 30 and control signal amplifier 32 are shown in FIG. 3. The firing angle advance limit circuit 30 is supplied by the secondary winding 29 of the transformer 16 which provides power input to a full wave diode bridge 59 in the limit circuit 30 through the conductors 31. The negative output terminal 60 of the diode bridge 59 is connected to a common conductor 61. The positive output terminal 62 of the diode bridge 59 is connected by a conductor 64 through a base resistor 65 and a unidirectional current conduction means such as a diode 66 to the base of a transistor 67. A biasing resistor 63 connects the conductor 64 to a negative voltage source 68. A biasing resistor 69 is connected between the conductor 61 and the base of the transistor 67, and the emitter of the transistor 67 is connected by a conductor 70 to the conductor 61.

The collector of the transistor 67 is connected through a diode 71 to the base of a transistor 72 by a conductor 74, a collector dissipation resistor 75 is connected between the collector of the transistor 67 and a positive voltage source 76, and a biasing resistor 77 is connected between the base of the transistor 72 and the common conductor 61. A conductor 79 connects the emitter of the transistor 72 to the common conductor 61 and a conductor 80 connects the collector of the transistor 72 to the gate of a symmetrical field effect transistor 81 through a biasing resistor 82. The field effect transistor 81 constitutes a bypass means and has its source and drain connected to the conductors 34 and 35. A collector dissipation resistor 83 connects the collector of the transistor 72 to the positive voltage source 76.

The conductors 34 and 35 connect the field effect transistor 81 across an operational amplifier 84 and its feedback resistor 85 of the control signal amplifier 32. The amplifier input is carried through the conductor 36 and an input resistor 86.

Figure 4:
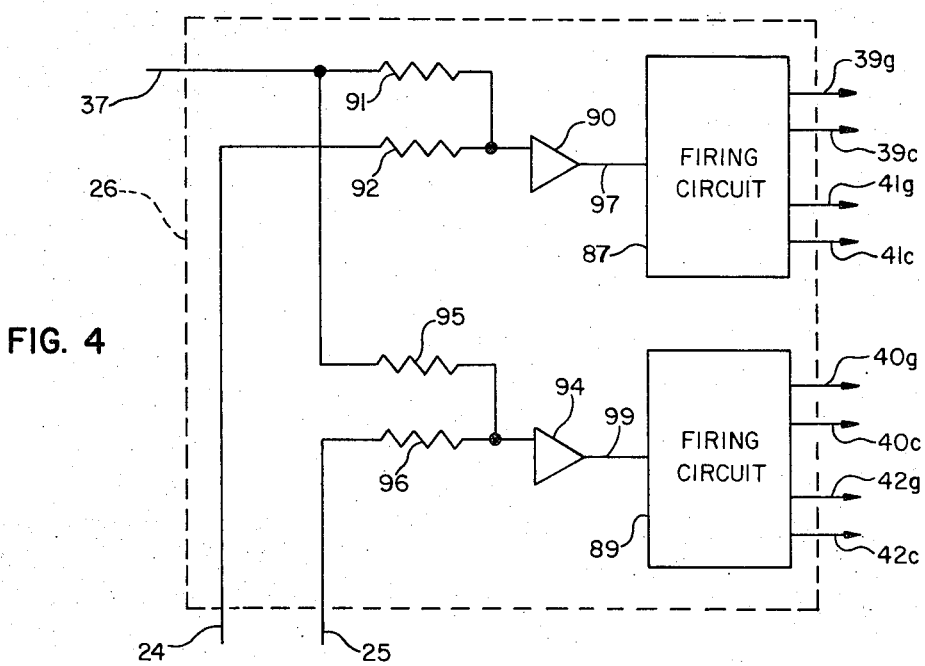
FIG. 4 is a schematic view, partially in block form, of an operating circuit for use in the system of FIG. 1.

The operating circuit 26 as shown in FIG. 4 comprises a pair of firing circuits 87 and 89 for supplying firing pulses to the thyristors 39–42 in the power amplifier 12 (FIG. 2). The firing circuit 87 controls thyristors 39 and 41 by sending pulses to the gate-cathode circuit of the thyristor 39 through conductors 39g and 39c and to the gate-cathode circuit of the thyristor 41 via conductors 41g and 41c. Similarly, the firing circuit 89 controls the firing of thyristors 40 and 42 through conductor pairs 40g, 40c, and 42g, 42c, respectively. The conductors 39g,c – 42g,c are the set of conductors 27 of FIG. 1.

An operational amplifier 90 of the operating circuit 26 sums the signals supplied by the control signal amplifier 32 through the conductor 37 and by the phase shifter 22 (FIG. 1) through the conductor 24 through input resistors 91 and 92, respectively. An operational amplifier 94 of the operating circuit 26 sums the signals supplied by the control signal amplifier 32 through the conductor 37 and by the phase shifter 22 through the conductor 25 through input resistors 95 and 96, respectively. Each amplifier 90 and 94 is constructed to function as a zero crossover detector switch. That is, whenever the sum of the inputs to either of the amplifiers 90 or 94 crosses over zero potential, its output switches to saturation with its polarity opposite that of the summed input signal. The outputs of amplifiers 90 and 94 are transmitted to the firing circuits 87 and 89 by conductors 97 and 99, respectively. A positive output of the amplifier 90 fires the thyristor 41 while a negative output fires the thyristor 39. Similarly, a positive output of amplifier 94 fires the thyristor 42 while a negative output fires the thyristor 40.

Figure 5:
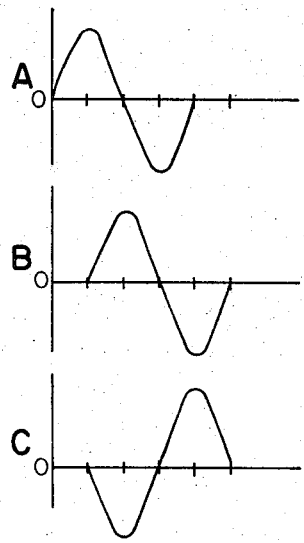
FIG. 5 is a series of graphs labeled A–C showing phase relationships between line voltage and the outputs of a phase shifter of FIG. 1.
Figure 6:
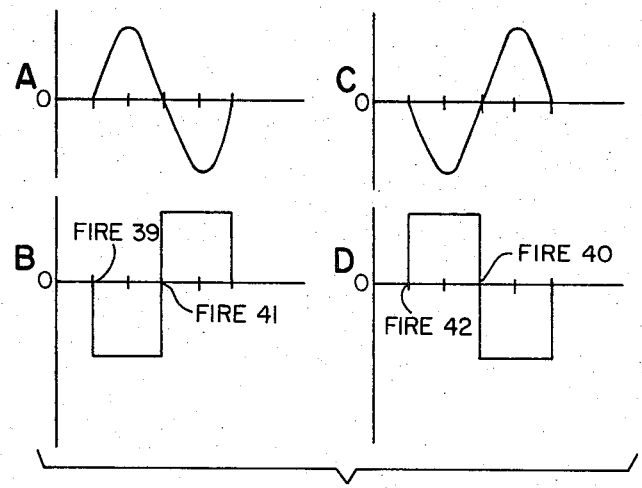
FIG. 6 is a series of graphs labeled A–D showing wave shapes for null operation of the power amplifier of FIG. 2.
Figure 7:
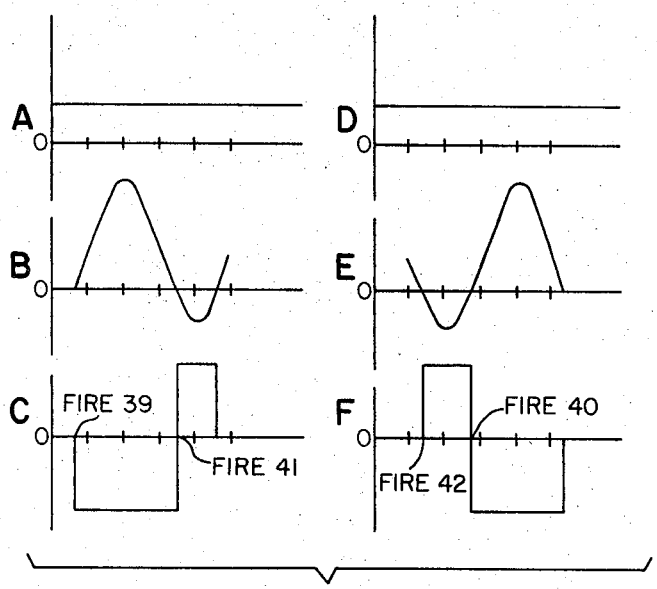
FIG. 7 is a series of graphs labeled A–F showing wave shapes for forward operation of a motor controlled by the system of FIG. 1.
Figure 8:
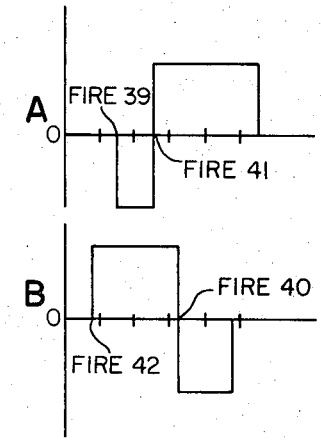
FIG. 8 is a pair of graphs labeled A and B showing wave shapes for reverse operation of the motor of FIG. 1.
Figure 10:
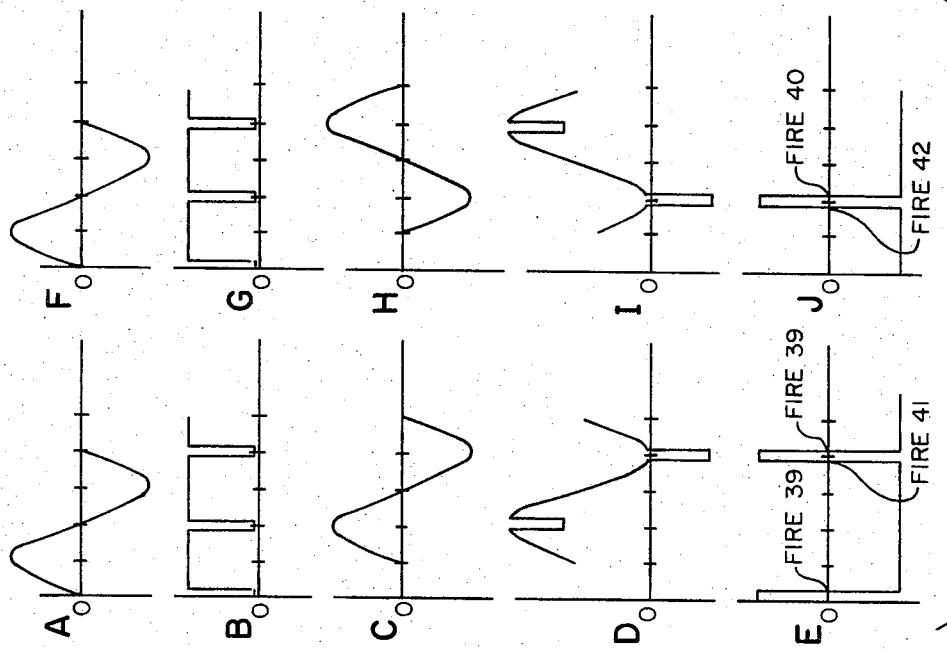
FIG. 10 is a series of graphs labeled A–J showing wave shapes for full power operation of a motor with a control circuit incorporating the firing angle advance limit circuit of FIG. 3.
Figure 9:
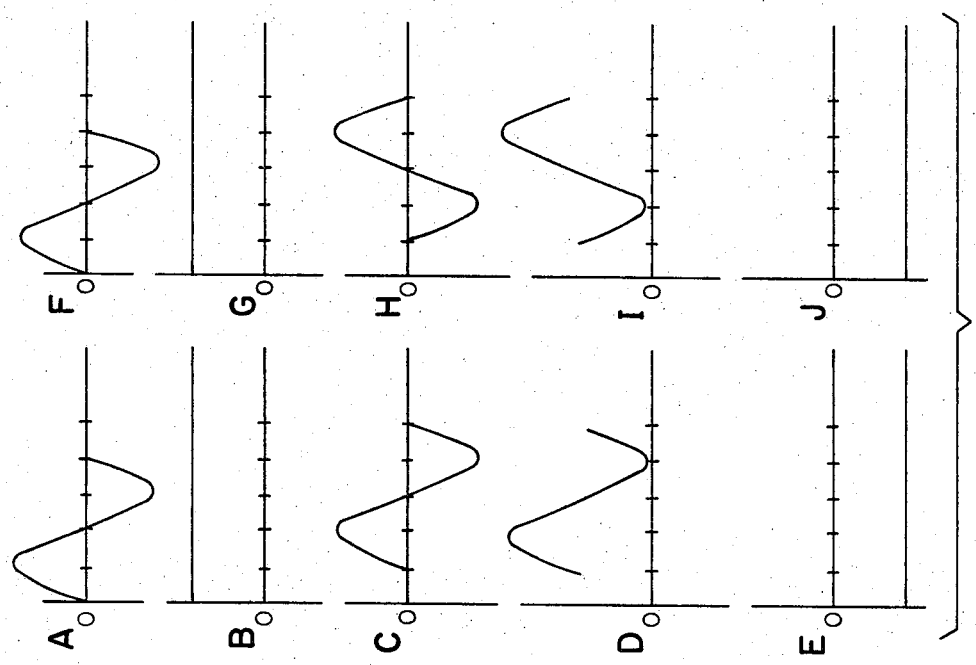
FIG. 9 is a series of graphs labeled A–J showing wave shapes for full power operation of a motor without firing angle advance limiting.

The operation of the system will now be described with reference to the curves of FIG. 5 through 10. The phase shifter 22 produces a sine wave voltage output, shown in FIG. 5B, which lags by 90° the line voltage, shown in FIG. 5A, induced in the secondary winding 44 of the power amplifier transformer 45 (FIG. 2). This lagging voltage is transmitted through the conductor 24 (FIG. 4) to the summing amplifier 90. A second sine wave voltage output leading the line voltage by 90° is shown in FIG. 5C and is transmitted from the phase shifter 22 through the conductor 25 to the amplifier 94.

For the condition of zero motor voltage and speed, the output of the control signal amplifier 32 (FIG. 1) is zero and the only inputs to the amplifier 90 and 94 are the voltage signals from the phase shifter 22. The resulting input signal to the amplifier 90, shown in FIG. 6A, produces the output shown in FIG. 6B. The input to the amplifier 94 (FIG. 6C) produces the output shown in FIG. 6D. As can be seen from FIGS. 6B and 6D, the thyristors 39 and 42 fire at 90° of the positive half cycle and the thyristors 40 and 41 fire at 90° of the negative half cycle of the line voltage.

For forward operation of the motor, the control signal amplifier 32 produces a positive unidirectional output voltage, as shown in FIGS. 7A and 7D. This is summed with the outputs of the phase shifter 22 (FIGS. 5B, 5C) to present the input voltage shown by the curve of FIG. 7B to the amplifier 90 and to present the input voltage shown by the curve of FIG. 7E to the amplifier 94. The resulting signals applied to the firing circuits 87 and 89 are shown in FIGS. 7C and 7F, respectively. It can be seen that the firing points of the thyristors 41 and 42 have been retarded. This presents a forward operating voltage to the armature 19 of the motor as heretofore explained with reference to FIG. 2. The duration of the applied voltage during each half cycle of line voltage (FIG. 5A) is thus determined by the magnitude of the control signal voltage (FIG. 7A).

If the output of the control signal amplifier 32 is a negative voltage signal, the firing circuits 87 and 89 are presented with firing signals such as those represented in FIGS. 8A and 8B, respectively. Now the firing of the thyristors 41 and 42 is advanced while the firing of the thyristors 39 and 40 is retarded. The polarity of applied armature voltage is reversed and the operating direction of the motor is correspondingly reversed. If the polarity of the control signal voltage is reversed during operation of the motor, the motor is plugged or slowed down by the reverse torque produced.

Applied motor voltage is maximized when the voltage output of the control signal amplifier 32 (FIGS. 9B and 9G) is at least equal in magnitude to the peak value of the output voltage curve of the phase shifter 22 (FIGS. 9C and 9H). The sums of these signals present unidirectional input voltage waves (FIGS. 9D and 9I) to the amplifiers 90 and 94, respectively. Because the voltage waves do not cross over zero potential, the second thyristor of each pair is never fired. For the positive voltage signal shown in FIGS. 9B and 9G, the signals of FIGS. 9E and 9J are presented to the firing circuits 87 and 89, respectively. Thus, firing pulses are applied to the gate-cathode circuits of the thyristors 39 and 40 throughout each entire cycle of applied line voltage (FIGS. 9A and 9F). During the positive half cycle of applied line voltage, the thyristor 39 conducts while the thyristor 40 does not conduct since it is back biased. During the negative half cycle of applied line voltage, the thyristor 40 conducts while the thyristor 39 blocks. In this manner the full cycle of applied line voltage is impressed upon the armature 19.

It has been found, however, if the conduction angle is allowed to increase to the full half cycle of applied line voltage, that upon subsequent decrease in the conduction period, high current pulses are generated in the circuit, due to reactive components therein, which can damage or destroy the thyristors. To protect the thyristor bridge, the advance of the thyristor firing angle must be limited so that a voltage is applied to the armature 19 only between about 10° and about 170° in each half cycle. For this purpose, the firing angle advance limit circuit 30 (FIG. 3) is provided.

Power input for the firing angle advance limit circuit 30 is provided by the secondary winding 29 of the transformer 16 and is fed through the rectifier bridge 59. The full wave rectified voltage from the bridge 59 is in phase with the line voltage (FIGS. 10A, 10F) in the secondary winding 44 of the transformer 45 of the power amplifier 12 and is impressed upon the base terminal electrode of the transistor 67. When the voltage applied to the base terminal electrode of the transistor 67 exceeds the back bias voltage supplied from the negative voltage source 68 to the diode 66, the transistor 67 turns on. The conduction of the transistor 67 reduces the base voltage of the transistor 72 so that it turns off. This in turn permits a positive voltage from the voltage source 76 to be applied to the gate circuit of the field effect transistor 81 so that it acquires a resistance of several megohms. This resistance is in parallel with the feedback resistor 85 and, since the gain of an operational amplifier is equal to the ratio of the feedback resistance to the input resistance, there is substantially no effect on the gain or operation of the amplifier 84.

During the short period from 170° of each half cycle to 10° of the next half cycle, the rectified sine wave voltage is not of sufficient magnitude to exceed the back bias of the diode 66 and the transistor 67 is turned off. This causes the transistor 72 to become conducting due to the application of a positive voltage to its base electrode, thereby diverting the biasing voltage from the gate circuit of the field effect transistor 81 to the common conductor 61. As a result, the resistance of the field effect transistor 81 drops to a relatively small ohmic value and the output of the amplifier 84 is accordingly diminished to almost zero (FIGS. 10B, 10G). The summed inputs to the amplifiers 90 and 94 of the operating circuits 26 (FIG. 4) are diminished accordingly. The input to the amplifier 90 is decreased and, as is shown in FIGS. 10A, 10D and 10E, crosses over zero voltage at about 170° of the negative half cycle of applied line voltage to fire the thyristor 41. The input to the amplifier 94 (FIGS. 10F, 10I and 10J) crosses over zero voltage at about 170° of the positive half cycle of applied line voltage to fire the thyristor 42.

The application of voltage to the armature 19 is thus limited to between about 10° and 170° during each half cycle of applied line voltage although adjustment of the resistor 63 (FIG. 3) could alter the negative diode bias and thus the conduction angle. Between about 170° and 180°, the line voltage of the secondary winding 44 (FIG. 2) is impressed on the entire reactor 50. From 0° to about 10°, no voltage is applied to the reactor 50 since the thyristor 39 does not fire until about 10° into the positive half cycle of line voltage (see FIGS. 10A and 10E) and the thyristor 40 does not fire until about 10° into the negative half cycle of line voltage (see FIGS. 10F and 10J). During this period, the reactor 50 resets, that is its flux density is decreased, and optimum operation of the power amplifier 12 is achieved while thyristor damage is prevented.

It should be apparent that the operation of the firing angle advance limit circuit 30 is the same when the control signal amplifier 32 has a negative output voltage. Only the firing order of each thyristor pair is reversed.

I claim:

1. A control system for operating a direct current motor from a source of alternating voltage, said control system including power amplifier means responsive to a control voltage for applying rectified operating voltage pulses to the motor during each cycle of the alternating voltage, means responsive to the magnitude of said control voltage to determine the duration of the operating voltage pulses, and limit means for minimizing the magnitude of said control voltage at a predetermined time in each half cycle of the alternating voltage to limit the duration of said pulses.

2. A control system as in claim 1 wherein control amplifier means amplifies said control voltage and said limit means includes bypass means shunting said control amplifier and responsive to control means to provide a low impedance path across said amplifier at said predetermined time in each half cycle of the alternating voltage.

3. A control system as in claim 2 wherein said control amplifier means has a feedback resistor and said bypass means is connected in parallel with the feedback resistor.

4. A control system as in claim 2 wherein said bypass means comprises a field effect transistor having a gate and said bypass control means provides a biasing voltage to said gate, and wherein said biasing voltage is removed to provide said low impedance path across the amplifier.

5. A control system as in claim 4 wherein said bypass control means comprises switching means responsive to input voltage pulses to control the biasing voltage applied to said field effect transistor gate, full wave rectifier means having input terminals and having an output terminal connected through a unidirectional current conduction means to said switching means to provide the input voltage pulses and means to provide a predetermined back bias voltage to said unidirectional current conduction means to limit the duration of the input voltage pulses, and wherein said switching means causes a biasing voltage to be applied to said field effect transistor gate during each of said input voltage pulses.

6. A control system as in claim 5 wherein said bypass control means includes means to adjust the magnitude of the back bias voltage to said unidirectional current conduction means.

7. A control system as in claim 5 wherein said power amplifier means comprises a rectifier bridge means having input and output terminals and including a first and second pair of controlled conduction devices, each having a triggering terminal, and a transformer means having a primary winding connected to said source and having a secondary winding, inductive reactor means, and wherein the secondary winding of said transformer means is connected to the input terminals of said rectifier bridge means, said inductive reactor means is connected across the output terminals of said rectifier bridge means and the motor is connected between the center of the secondary winding of said transformer means and the center of said inductive reactor means.

8. A control system as in claim 7 wherein said bypass control means includes a transformer means having a primary winding connected to said source and having a secondary winding connected across the input terminals of said full wave rectifier means whereby alternating voltage is induced in the secondary winding of said bypass control transformer means in phase with alternating voltage induced in the secondary winding of said power amplifier transformer means.

9. A control system as in claim 7 wherein said means to determine the duration of the operating voltage pulses includes firing means to selectively fire a first one of each pair of controlled conduction devices on alternate half cycles of said alternating voltage to begin said operating voltage pulses and firing means to selectively fire a second one of each pair of controlled conduction devices on said alternate half cycles of said alternating voltage to terminate said operating voltage pulses.

* * * * *